US012676482B2

(12) United States Patent
Hu et al.

(10) Patent No.: US 12,676,482 B2
(45) Date of Patent: Jul. 7, 2026

(54) METHOD FOR DISCHARGE CONTROL OF FULL-BUS LOAD IN HOUSEHOLD APPLIANCE, AND RELATED APPARATUSES

(71) Applicants: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

(72) Inventors: Bin Hu, Foshan (CN); Tan Long, Foshan (CN); Hongming Zhou, Foshan (CN); Zhaobin Huang, Foshan (CN); Wenkai Zhang, Foshan (CN); Xiaojun Yan, Foshan (CN); Jienan Zhang, Foshan (CN); Dong Wei, Foshan (CN); Ran Bi, Foshan (CN); Yunsong Xu, Foshan (CN)

(73) Assignees: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 19/000,946

(22) Filed: Dec. 24, 2024

(65) Prior Publication Data

US 2025/0132563 A1    Apr. 24, 2025

Related U.S. Application Data

(63) Continuation of application No. PCT/CN2023/097854, filed on Jun. 1, 2023.

(30) Foreign Application Priority Data

Jun. 29, 2022    (CN) .......................... 202210764682.8

(51) Int. Cl.
*H02J 3/14* (2026.01)
*H02J 105/42* (2026.01)

(52) U.S. Cl.
CPC ............. *H02J 3/14* (2013.01); *H02J 2105/42* (2026.01)

(58) Field of Classification Search
CPC ................................ H02J 3/14; H02J 2310/14
(Continued)

(56) References Cited

U.S. PATENT DOCUMENTS 10,391,870 B2 * 8/2019 Götz ....................... B60L 53/62
2022/0376631 A1 * 11/2022 Tremblay ................ H02M 7/06
(Continued)

FOREIGN PATENT DOCUMENTS

CN        107147101 A        9/2017
CN        110120752 A        8/2019
(Continued)

OTHER PUBLICATIONS

Extended European search report dated May 28, 2025 received in European Patent Application No. 23829848.3.
(Continued)

*Primary Examiner* — Michael R. Fin
(74) *Attorney, Agent, or Firm* — SCULLY, SCOTT, MURPHY & PRESSER, P.C.

(57)                    ABSTRACT

Provided are a method for controlling a full bus load to discharge in a household electrical appliance and related apparatuses. In the method, in response to determining that a half bus load is turned on and a full bus load is turned off, a voltage difference between a first DC power and a second DC power is determined to obtain a voltage difference. The first DC power and the second DC power are obtained by converting three-phase power through a three-level active PFC unit. Subsequent to the voltage difference between the (Continued)

first DC power and the second DC power being determined, a full bus load is controlled to be turned on or off based on the voltage difference to stabilize a half bus voltage in a predetermined voltage interval.

15 Claims, 5 Drawing Sheets

(58) Field of Classification Search
USPC ........................................................... 307/24
See application file for complete search history.

(56) References Cited

U.S. PATENT DOCUMENTS

| | | | | |
|---|---|---|---|---|
| 2023/0275525 A1* | 8/2023 | Huang | .................. | H02M 1/008 |
| | | | | 363/127 |
| 2024/0204656 A1* | 6/2024 | Zhao | ..................... | H02M 7/217 |
| 2024/0235178 A1* | 7/2024 | Huang | ................... | H02J 9/062 |
| 2025/0132563 A1* | 4/2025 | Hu | ........................... | H02M 7/06 |
| 2025/0132663 A1* | 4/2025 | Hu | ........................ | H02M 7/219 |
| 2025/0135928 A1* | 5/2025 | Liang | ..................... | B60L 55/00 |

FOREIGN PATENT DOCUMENTS

| | | |
|---|---|---|
| CN | 113690894 A | 11/2021 |
| CN | 114337328 A | 4/2022 |
| EP | 3584903 A1 | 12/2019 |
| WO | 2020237863 A1 | 12/2020 |

OTHER PUBLICATIONS

Rivera, S. et al., "Electric Vehicle Charging Station With Energy Storage Stage for Split-DC ON Bus Voltage Balancing", IEEE Transactions on Power Electronics, Mar. 2017, pp. 2376-2386, vol. 32, No. 3.

Safayatullah, M. et al., "A Comprehensive Review of Power Converter Topologies and Control Methods for Electric Vehicle Fast Charging Applications", IEEE Access, 2022, pp. 40753-40793, vol. 10.

International Search Report dated Sep. 27, 2023 issued in PCT/CN2023/097854, 5 pages.

Written Opinion dated Sep. 27, 2023 issued in PCT/CN2023/097854, 7 pages.

* cited by examiner

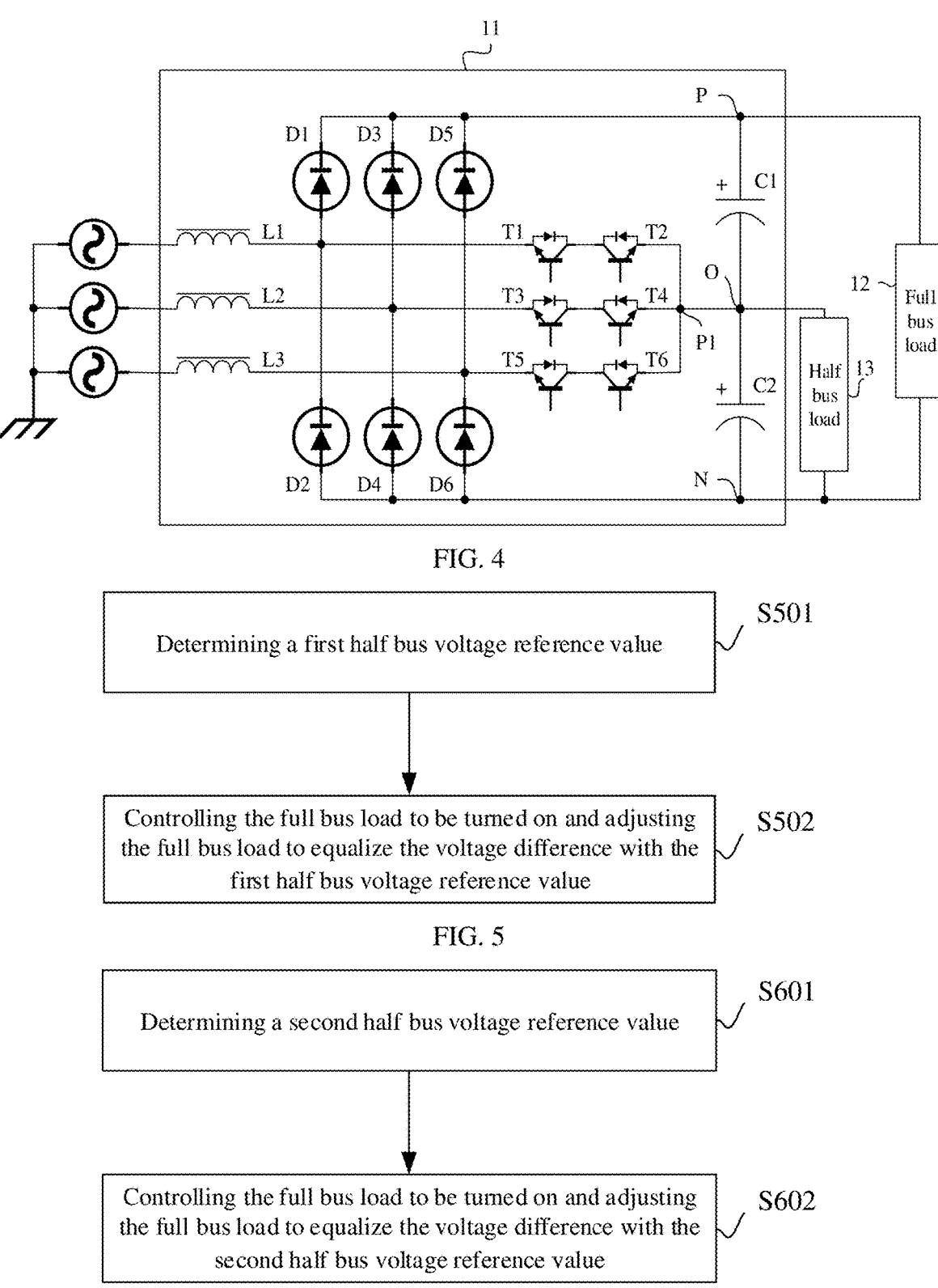

FIG. 4

| | |
|---|---|
| Determining a first half bus voltage reference value | S501 |

Controlling the full bus load to be turned on and adjusting the full bus load to equalize the voltage difference with the first half bus voltage reference value — S502

FIG. 5

Determining a second half bus voltage reference value — S601

Controlling the full bus load to be turned on and adjusting the full bus load to equalize the voltage difference with the second half bus voltage reference value — S602

FIG. 6

METHOD FOR DISCHARGE CONTROL OF FULL-BUS LOAD IN HOUSEHOLD APPLIANCE, AND RELATED APPARATUSES

CROSS-REFERENCE TO RELATED APPLICATIONS

This application is a continuation application of International Application No. PCT/CN2023/097854 filed on Jun. 1, 2023, which claims priority to Chinese Patent Application No. 202210764682.8, entitled "METHOD FOR CONTROLLING FULL BUS LOAD TO DISCHARGE IN HOUSEHOLD ELECTRICAL APPLIANCE, AND RELATED APPARATUS" and filed on Jun. 29, 2022, the entire contents of each of which are incorporated herein by reference for all purposes. No new matter has been introduced.

FIELD

The present disclosure relates to the field of household electrical appliance control technologies, and more particularly, to a method for controlling a full bus load to discharge in a household electrical appliance, and related apparatuses.

BACKGROUND

With the development of the power grid, three-phase power is applied more frequently, and the application of the three-phase power is becoming safer.

In the use of some Direct Current (DC) loads, the three-phase power may be converted to a DC power. However, with a voltage of the three-phase power being relatively high, if the voltage is not controlled after the three-phase power is converted to the DC power for use, overvoltage is likely to occur, which results in damage to a circuit or a load device, and even fire under certain serious circumstances, thereby jeopardizing the safety of a user and the safety of the property of the user.

SUMMARY

The present disclosure aims to solve at least one of the technical problems in the related art. To this end, an objective of the present disclosure is to provide a method for controlling a full bus load to discharge in a household electrical appliance, which can perform a voltage stabilization control on a bus voltage, thereby avoiding overvoltage or undervoltage of the bus, and improving service life and operation safety of the household electrical appliance.

A second objective of the present disclosure is to provide a power control board usable with a household electrical appliance.

A third objective of the present disclosure is to provide a household electrical appliance.

To achieve the above objectives, the present disclosure provides the method for controlling the full bus load to discharge in the household electrical appliance. The household electrical appliance includes a three-level active Power Factor Correction (PFC) unit, a full bus load, and a half bus load. The three-level active PFC unit includes an upper half bus capacitor and a lower half bus capacitor connected in series between a positive terminal of a Direct Current (DC) bus and a negative terminal of the DC bus. A node between the upper half bus capacitor and the lower half bus capacitor is a midpoint of the DC bus. The three-level active PFC unit is configured to convert an inputted three-phase power to output a first DC power and a second DC power through the positive terminal of the DC bus, the negative terminal of the DC bus, and the midpoint of the DC bus. The first DC power is configured to supply power to the full bus load. The second DC power is configured to supply power to the half bus load. The method includes: determining a voltage difference between the first DC power and the second DC power when the full bus load is turned off and the half bus load is turned on; and controlling the full bus load to be turned on or off based on the voltage difference to stabilize a half bus voltage in a predetermined voltage interval.

In the method for controlling the full bus load to discharge in the household electrical appliance according to this embodiment, firstly, in response to determining that only the half bus load is turned on and the full bus load is turned off, the voltage difference between the first DC power and the second DC power is determined. The first DC power and the second DC power are obtained by converting the three-phase power through the three-level active PFC unit. Subsequent to the voltage difference between the first DC power and the second DC power being determined, the full bus load is controlled to be turned on or off based on the voltage difference to stabilize the half bus voltage in the predetermined voltage interval. Therefore, the method in this embodiment can perform the voltage stabilization control on the bus voltage, thereby avoiding the overvoltage or the undervoltage of the bus, and improving the service life and the operation safety of the household electrical appliance.

In some embodiments of the present disclosure, when the second DC power is outputted from the midpoint of the DC bus and the negative terminal of the DC bus, the voltage difference is a voltage between the positive terminal of the DC bus and the midpoint of the DC bus. When the second DC power is outputted from the midpoint of the DC bus and the positive terminal of the DC bus, the voltage difference is a voltage between the midpoint of the DC bus and the negative terminal of the DC bus.

In some embodiments of the present disclosure, when the second DC power is outputted from the midpoint of the DC bus and the negative terminal of the DC bus, the controlling the full bus load to be turned on or off based on the voltage difference includes: determining a first half bus voltage reference value; and controlling the full bus load to be turned on and adjusting the full bus load to equalize the voltage difference with the first half bus voltage reference value.

In some embodiments of the present disclosure, when the second DC power is outputted from the midpoint of the DC bus and the negative terminal of the DC bus, the controlling the full bus load to be turned on or off based on the voltage difference includes: controlling, when the voltage difference is greater than or equal to a first predetermined voltage threshold, the full bus load to be turned on to discharge the upper half bus capacitor; and controlling, when the voltage difference is smaller than or equal to a second predetermined voltage threshold, the full bus load to be turned off to charge the upper half bus capacitor. The first predetermined voltage threshold is greater than the second predetermined voltage threshold.

In some embodiments of the present disclosure, when the second DC power is outputted from the midpoint of the DC bus and the positive terminal of the DC bus, the controlling the full bus load to be turned on or off based on the voltage difference includes: determining a second half bus voltage reference value; and controlling the full bus load to be turned on and adjusting the full bus load to equalize the voltage difference with the second half bus voltage reference value.

In some embodiments of the present disclosure, when the second DC power is outputted from the midpoint of the DC bus and the positive terminal of the DC bus, the controlling the full bus load to be turned on or off based on the voltage difference includes: controlling, when the voltage difference is greater than or equal to a third predetermined voltage threshold, the full bus load to be turned on to discharge the lower half bus capacitor; and controlling, when the voltage difference is smaller than or equal to a fourth predetermined voltage threshold, the full bus load to be turned off to charge the lower half bus capacitor. The third predetermined voltage threshold is greater than the fourth predetermined voltage threshold.

In some embodiments of the present disclosure, the full bus load is a compressor. The half bus load is a DC fan.

To achieve the above objective, the embodiments of a second aspect of the present disclosure provide the power control board for the household electrical appliance. The power control board includes: a memory; a processor; and a program, for controlling a full bus load to discharge in a household electrical appliance, stored in the memory and executable on the processor. The processor, when executing the program for controlling the full bus load to discharge in the household electrical appliance, performs the method for controlling the full bus load to discharge in the household electrical appliance according to the above embodiments.

In the power supply control board for the household electrical appliance according to embodiments of the present disclose, the power supply control board includes the memory and the processor. The processor executes the program, for controlling the full bus load to discharge in the household electrical appliance, stored in the memory, which can perform the voltage stabilization control on the bus voltage, thereby avoiding the overvoltage or the undervoltage of the bus, and improving the service life and the operation safety of the household electrical appliance.

To achieve the above objective, the embodiments of a third aspect of the present disclosure provide the household electrical appliance. The household electrical appliance includes: a full bus load; a half bus load; a power control board including a three-level active Power Factor Correction (PFC) unit and a control unit. The three-level active PFC unit includes an upper half bus capacitor and a lower half bus capacitor connected in series between a positive terminal of a Direct Current (DC) bus and a negative terminal of the DC bus. A node between the upper half bus capacitor and the lower half bus capacitor is a midpoint of the DC bus. The three-level active PFC unit is configured to convert an inputted three-phase power to output a first DC power and a second DC power through the positive terminal of the DC bus, the negative terminal of the DC bus, and the midpoint of the DC bus. The first DC power is configured to supply power to the full bus load. The second DC power is configured to supply power to the half bus load. The control unit is configured to: determine a voltage difference between the first DC power and the second DC power when the full bus load is turned off and the half bus load is turned on; and control the full bus load to be turned on or off based on the voltage difference to stabilize a half bus voltage in a predetermined voltage interval.

In some embodiments of the present disclosure, when the second DC power is outputted from the midpoint of the DC bus and the negative terminal of the DC bus, the voltage difference is a voltage between the positive terminal of the DC bus and the midpoint of the DC bus; and when the second DC power is outputted from the midpoint of the DC bus and the positive terminal of the DC bus, the voltage difference is a voltage between the midpoint of the DC bus and the negative terminal of the DC bus.

In some embodiments of the present disclosure, when the second DC power is outputted from the midpoint of the DC bus and the negative terminal of the DC bus, the control unit is configured to control the full bus load to be turned on or off based on the voltage difference by: determining a first half bus voltage reference value; and controlling the full bus load to be turned on and adjusting the full bus load to equalize the voltage difference with the first half bus voltage reference value.

In some embodiments of the present disclosure, when the second DC power is outputted from the midpoint of the DC bus and the negative terminal of the DC bus, the control unit is configured to control the full bus load to be turned on or off based on the voltage difference by: controlling, when the voltage difference is greater than or equal to a first predetermined voltage threshold, the full bus load to be turned on to discharge the upper half bus capacitor; and controlling, when the voltage difference is smaller than or equal to a second predetermined voltage threshold, the full bus load to be turned off to charge the upper half bus capacitor. The first predetermined voltage threshold is greater than the second predetermined voltage threshold.

In some embodiments of the present disclosure, when the second DC power is outputted from the midpoint of the DC bus and the positive terminal of the DC bus, the control unit is configured to control the full bus load to be turned on or off based on the voltage difference by: determining a second half bus voltage reference value; and controlling the full bus load to be turned on and adjusting the full bus load to equalize the voltage difference with the second half bus voltage reference value.

In some embodiments of the present disclosure, when the second DC power is outputted from the midpoint of the DC bus and the positive terminal of the DC bus, the control unit is configured to control the full bus load to be turned on or off based on the voltage difference by: controlling, when the voltage difference is greater than or equal to a third predetermined voltage threshold, the full bus load to be turned on to discharge the lower half bus capacitor; and controlling, when the voltage difference is smaller than or equal to a fourth predetermined voltage threshold, the full bus load to be turned off to charge the lower half bus capacitor. The third predetermined voltage threshold is greater than the fourth predetermined voltage threshold.

In some embodiments of the present disclosure, the full bus load is a compressor and the half bus load is a DC fan.

In the household electrical appliance according to these embodiments, when the control unit in the power control board determines that the half bus load is turned on and the full bus load is turned off, the voltage difference between the first DC power and the second DC power is determined. The first DC power and the second DC power are obtained by converting the three-phase power through the three-level active PFC unit. Subsequent to the voltage difference between the first DC power and the second DC power being determined, the full bus load is controlled to be turned on or off based on the voltage difference to stabilize the half bus voltage in the predetermined voltage interval. Therefore, the household electrical appliance in this embodiment can perform the voltage stabilization control on the bus voltage, thereby avoiding the overvoltage or the undervoltage of the bus, and improving the service life and the operation safety of the household electrical appliance.

Additional aspects and advantages of the embodiments of the present disclosure will be given at least in part in the following description, or become apparent at least in part from the following description, or can be learned from practicing of the embodiments of the present disclosure.

BRIEF DESCRIPTION OF THE DRAWINGS

FIG. 4 is a circuit schematic view of a household electrical appliance according to another embodiment of the present disclosure.

FIG. 5 is a flowchart of a method for controlling a full bus load to discharge in a household electrical appliance according to another embodiment of the present disclosure.

FIG. 6 is a flowchart of a method for controlling a full bus load to discharge in a household electrical appliance according to yet another embodiment of the present disclosure.

DETAILED DESCRIPTION OF EMBODIMENTS

Figure 1:
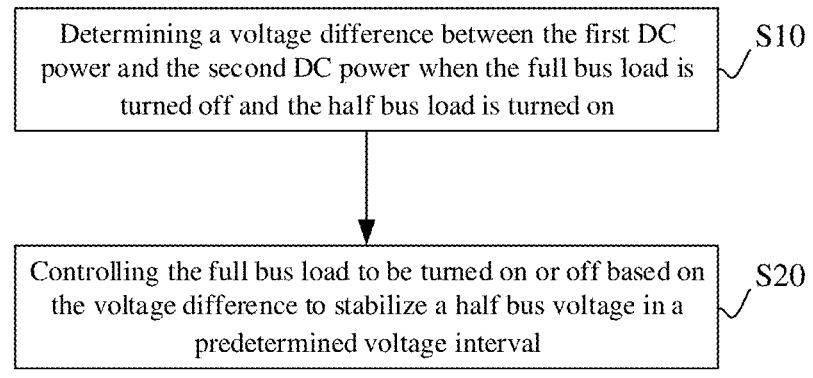
FIG. 1 is a flowchart of a method for controlling a full bus load to discharge in a household electrical appliance according to an embodiment of the present disclosure.

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only and intended to explain, rather than limiting, the present disclosure.

A method for controlling a full bus load to discharge in a household electrical appliance and a related apparatus according to the embodiments of the present disclosure are described below with reference to the accompanying drawings.

Figure 2:
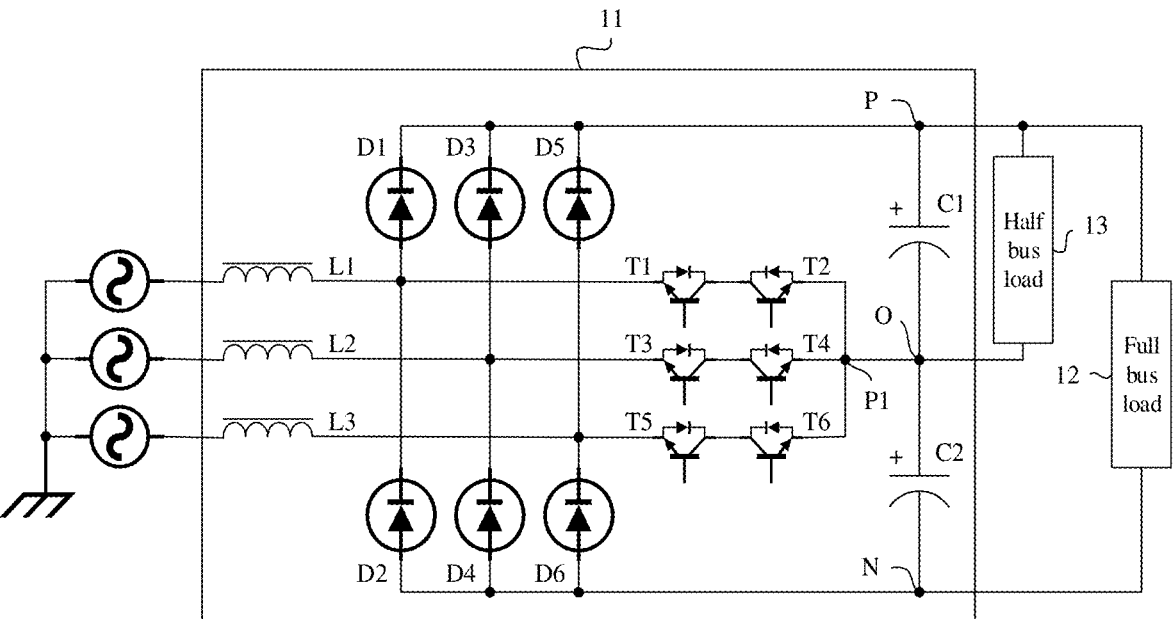
FIG. 2 is a circuit schematic view of a household electrical appliance according to an embodiment of the present disclosure.

FIG. 1 is a flowchart of the method for controlling the full bus load to discharge in the household electrical appliance according to an embodiment of the present disclosure As shown in FIG. 1, the present disclosure provides the method for controlling the full bus load to discharge in the household electrical appliance. The household electrical appliance includes a three-level active Power Factor Correction (PFC) unit, a full bus load, and a half bus load. Details as shown in FIG. 2, the household electrical appliance includes a three-level active PFC unit or PFC circuit 11, a full bus load 12, and a half bus load 13. The three-level active PFC unit 11 includes an upper half bus capacitor C1 and a lower half bus capacitor C2 connected in series between a positive terminal P of a Direct Current (DC) bus and a negative terminal N of the DC bus. A node between the upper half bus capacitor C1 and the lower half bus capacitor C2 is the midpoint O of the DC bus. The three-level active PFC unit 11 is configured to convert an inputted three-phase power to output a first DC power and a second DC power through the positive terminal P of the DC bus, the negative terminal N of the DC bus, and the midpoint O of the DC bus. The first DC power is configured to supply power to the full bus load 12. The second DC power is configured to supply power to the half bus load 13.

In an exemplary embodiment of the present disclosure, the three-phase power may be converted into the DC power subsequent to being processed by the three-level active PFC unit 11, and may be outputted from the positive terminal P of the DC bus, the negative terminal N of the DC bus, and the midpoint O of the DC bus. More details, the first DC power is outputted from the positive terminal P of the DC bus and the negative terminal N of the DC bus. The second DC power is outputted from the midpoint O of the DC bus and the positive terminal P of the DC bus, or the second DC power is outputted from the midpoint O of the DC bus and the negative terminal N of the DC bus. It should be understood that a bus on which the positive terminal P of the DC bus is located is a positive bus, and a bus on which the negative terminal N of the DC bus is located is a negative bus. A load connected between the positive bus and the negative bus is the full bus load 12, and a load connected between the midpoint O of the DC bus and the positive bus or the negative bus is the half bus load 13.

In another exemplary embodiment of the present disclosure, as shown in FIG. 2, the three-level active PFC unit 11 in this embodiment includes a first inductor L1, a second inductor L2, a third inductor L3, a three-phase rectifier bridge, a first power module, a second power module, and a third power module.

One terminal of the first inductor L1, one terminal of the second inductor L2, and one terminal of the third inductor L3 are used as three-phase input terminals. A first input terminal of the three-phase rectifier bridge is connected to another terminal of the first inductor L1. A second input terminal of the three-phase rectifier bridge is connected to another terminal of the second inductor L2. A third input terminal of the three-phase rectifier bridge is connected to another terminal of the third inductor L3. One terminal of the first power module is connected to the first input terminal of the three-phase rectifier bridge. One terminal of the second power module is connected to the second input terminal of the three-phase rectifier bridge. One terminal of the third power module is connected to the third input terminal of the three-phase rectifier bridge. Another terminal of the first power module, another terminal of the second power module, and another terminal of the third power module are connected together to form a first node P1. The first node P1 is connected to the midpoint O of the DC bus. A positive terminal of the upper half bus capacitor C1 is connected to the positive terminal P of the DC bus and to a first output terminal of the three-phase rectifier bridge. A negative terminal of the upper half bus capacitor C1 is connected to a positive terminal of the second electrolytic capacitor C2. A negative terminal of the lower half bus capacitor C2 is connected to the negative terminal N of the DC bus and to a second output terminal of the three-phase rectifier bridge.

In an exemplary embodiment of the present disclosure, as shown in FIG. 2, the first inductor L1, the second inductor L2, and the third inductor L3 in the three-level active PFC unit 11 are connected to the three-phase power. That is, one terminal of each of the first inductor L1, the second inductor L2 and the third inductor L3 may be used as one three-phase input terminal of the three-level active PFC unit 11. The three-phase power is inputted into the three-level active PFC unit 11 from the three-phase input terminals, and subsequent to the three-phase power passing through the first inductor to the third inductor, it may enter into the three-phase rectifier bridge for rectification.

In another exemplary embodiment of the present disclosure, referring to FIG. 2, the three-phase rectifier bridge includes three groups of diodes connected in parallel with each other. Each group of diodes includes two diodes connected in series in a same direction. For example, a first group of diodes includes a first diode D1 and a second diode D2. A second group of diodes includes a third diode D3 and a fourth diode D4. A third group of diodes includes a fifth diode D5 and a sixth diode D6. An anode of the first diode D1 is connected to a cathode of the second diode D2. An anode of the third diode D3 is connected to a cathode of the fourth diode D4. An anode of the fifth diode D5 is connected to a cathode of the sixth diode D6. A cathode of the first diode D1, a cathode of the third diode D3, and a cathode of the fifth diode D5 are connected together. An anode of the second diode D2, an anode of the fourth diode D4, and an anode of the sixth diode D6 are connected together.

A connection node between the first diode D1 and the second diode D2 serves as the first input terminal of the three-phase rectifier bridge, and the first input terminal is connected to another terminal of the first inductor L1. A connection node between the third diode D3 and the fourth diode D4 serves as the second input terminal of the three-phase rectifier bridge, and the second input terminal is connected to another terminal of the second inductor L2. A connection node between the fifth diode D5 and the sixth diode D6 serves as the third input terminal of the three-phase rectifier bridge, and the third input terminal is connected to another terminal of the third inductor L3.

In another exemplary embodiment of the present disclosure, the diode in this embodiment is implemented as a fast recovery diode with a withstand voltage of 1200 V, or may be implemented as an Insulated Gate Bipolar Transistor (IGBT) with an anti-parallel diode.

The three-level active PFC unit 11 further includes first to third power modules. The first power module includes a first switch tube T1 and a second switch tube T2. The second power module includes a third switch tube T3 and a fourth switch tube T4. The third power module includes a fifth switch tube T5 and a sixth switch tube T6. More particularly, in some embodiments, the first switch tube T1 and the second switch tube T2 in the first power module are connected in reverse series. The third switch tube T3 and the fourth switch tube T4 in the second power module are connected in reverse series. The fifth switch tube T5 and the sixth switch tube T6 in the third power module are connected in reverse series. Emitters of the first switch tube T1, the third switch tube T3, and the fifth switch tube T5 are respectively connected to three input terminals of the three-phase rectifier bridge, or collectors of the third switch tube T3 and the fifth switch tube T5 are respectively connected to the three input terminals of the three-phase rectifier bridge. Emitters of the second switch tube T2, the fourth switch tube T4, and the sixth switch tube T6 are connected together to form the first node P1, or collectors of the second switch tube T2, the fourth switch tube T4, and the sixth switch tube T6 are connected together to form the first node P1.

Figure 3:
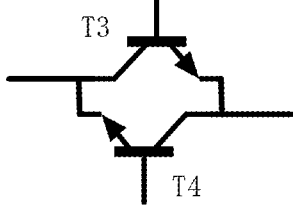
FIG. 3 is a schematic view of a connection relationship of switch tubes in a power module according to a specific embodiment of the present disclosure.

In some other embodiments, as shown in FIG. 3, the two switch tubes included in each power module may be connected together in reverse parallel, i.e., the emitter of the third switch tube T3 is connected to the collector of the fourth switch tube T4, and the collector of the third switch tube T3 is connected to the emitter of the fourth switch tube T4.

It should be noted that whether it is a power module composed of two switch tubes in reverse series or a power module composed of two switch tubes in reverse parallel, the power module can be made to conduct or block bi-directionally by controlling the two switch tubes. As shown in FIG. 3, if gates of the third switch tube T3 and the fourth switch tube T4 are simultaneously provided with turn-on driving signals, the corresponding power modules can be controlled to conduct bi-directionally; and if the gates of the third switch tube T3 and the fourth switch tube T4 are simultaneously provided with turn-off driving signals, the corresponding power modules can be controlled to block bi-directionally.

In another exemplary embodiment of the present disclosure, the switch tube in this embodiment may be an IGBT with a withstand voltage of 650 V.

The method for controlling the full bus load to discharge in this embodiment is completed based on the above-described embodiments. In an exemplary embodiment of the present disclosure, referring to FIG. 1, the method in this embodiment includes operations at blocks.

At block S10, a voltage difference between the first DC power and the second DC power is determined when the full bus load is turned off and the half bus load is turned on.

In an exemplary embodiment of the present disclosure, as shown in FIG. 2, when the full bus load 12 in this embodiment is turned off while the half bus load 13 is turned on, the voltage difference between the first DC power and the second DC power is determined. The first DC power is a power source supplying power to the full bus load 12, and the second DC power is a power source supplying power to the half bus load 13.

Since the half bus load 13 may be connected to the bus in two ways, the voltage difference in this embodiment may be determined in two ways. When the second DC power is outputted from the midpoint O of the DC bus and the positive terminal P of the DC bus, the voltage difference is a voltage between the midpoint O of the DC bus and the negative terminal N of the DC bus. As shown in FIG. 2 in detail, the half bus load 13 is connected between the midpoint O of the DC bus and the positive terminal P of the DC bus, i.e. the first DC power is outputted from the positive terminal P of the DC bus and the negative terminal N of the DC bus, and the second DC power is outputted from the positive terminal P of the DC bus and the midpoint O of the DC bus. The voltage difference between the first DC power and the second DC power is equal to the voltage between the midpoint O of the DC bus and the negative terminal N of the DC bus.

When the second DC power is outputted from the midpoint O of the DC bus and the negative terminal N of the DC bus, the voltage difference is a voltage between the positive terminal P of the DC bus and the midpoint O of the DC bus. Referring to FIG. 4, the half bus load 13 is connected between the midpoint O of the DC bus and the negative terminal N of the DC bus, i.e., the first DC power is outputted from the positive terminal P of the DC bus and the negative terminal N of the DC bus, and the second DC power is outputted from the negative terminal N of the DC bus and the midpoint O of the DC bus. The voltage difference between the first DC power and the second DC power is equal to the voltage between the positive terminal P of the DC bus and the midpoint O of the DC bus.

At block S20, the full bus load is controlled to be turned on or off based on the voltage difference to stabilize a half bus voltage in a predetermined voltage interval.

In an exemplary embodiment of the present disclosure, subsequent to the voltage difference between the first DC power and the second DC power being determined, the full bus load may be further controlled based on the voltage difference. More details, operating electrical parameters of the full bus load may be controlled, such as operating power, voltage, current. Since the full bus load to be turned on or off can have a certain impact on the bus voltage, such as turn-on of the full bus load may reduce the voltage, and turn-off of the full bus load may increase the voltage, the half bus voltage can be stabilized in the predetermined voltage interval by controlling the full bus load to be turned on or off.

In some embodiments, when the second DC power is outputted from the midpoint of the DC bus and the negative terminal of the DC bus, as shown in FIG. 5, the controlling the full bus load to be turned on or off based on the voltage difference includes operations at blocks.

At block S501, a first half bus voltage reference value is determined.

At block S502, the full bus load is controlled to be turned on and the full bus load is adjusted to equalize the voltage difference with the first half bus voltage reference value by charging and discharging the upper half bus capacitor.

In an exemplary embodiment of the present disclosure, referring to FIG. 4 and FIG. 5, the second DC power is outputted from the midpoint O of the DC bus and the negative terminal N of the DC bus. A first half bus voltage reference value V1_ref is first determined in this embodiment, and the first half bus voltage reference value V1_ref may be a reference value of the lower half bus voltage, i.e., a reference value of the voltage between the midpoint O of the DC bus and the negative terminal N of the DC bus. In response to determining the voltage difference and the first half bus voltage reference value V1_ref, the two are compared. The full bus load is adjusted based on a comparison result. Information such as power, current, and voltage of the full bus load may be adjusted. It should be understood that by adjusting the full bus load, a discharge state of the upper half bus capacitor may be controlled, and then the voltage difference may be adjusted to allow the voltage difference to be equal to the first half bus voltage reference value V1_ref. In this way, the half bus load is ensured to operate in a better state.

It should be noted that, in some embodiments, in response to determining the voltage difference and the first half bus voltage reference value V1_ref, the two are compared. When the voltage difference is greater than the first half bus voltage reference value V1_ref, it indicates that a power supply voltage of the half bus load 13 is relatively large in this case, and there may be a risk of overvoltage. Therefore, the full bus load 12 is controlled to be turned on to discharge the upper half bus capacitor C1, so as to complete a voltage reduction process on a voltage between the midpoint O of the DC bus and the negative terminal N of the DC bus. In this way, the voltage difference is equal to or close to the first half bus voltage reference value V1_ref, thereby preventing a fault caused by an overvoltage operation of the half bus load 13. When the voltage difference is smaller than the first half bus voltage reference value V1_ref, it indicates that the power supply voltage of the half bus load 13 is relatively small in this case, and there may be a risk of insufficient power supply. Therefore, the full bus load 12 is controlled to be turned off to charge the upper half bus capacitor C1, so as to complete a voltage boosting process on the voltage between the midpoint O of the DC bus and the negative terminal N of the DC bus. In this way, the voltage difference is equal to or close to the first half bus voltage reference value V1_ref, thereby ensuring that the half bus load 13 can operate normally.

In some embodiments, when the second DC power is outputted from the midpoint of the DC bus and the negative terminal of the DC bus, the controlling the full bus load to be turned on or off based on the voltage difference includes: controlling, when the voltage difference is greater than or equal to a first predetermined voltage threshold, the full bus load 12 to be turned on to discharge the upper half bus capacitor C1; and controlling, when the voltage difference is smaller than or equal to a second predetermined voltage threshold, the full bus load 12 to be turned off to charge the upper half bus capacitor C1. The first predetermined voltage threshold is greater than the second predetermined voltage threshold.

In an exemplary embodiment of the present disclosure, referring to FIG. 4, the second DC power is outputted from the midpoint O of the DC bus and the negative terminal N of the DC bus. In order to control the voltage difference between the first DC power and the second DC power to be within the predetermined voltage interval, the first predetermined voltage threshold and the second predetermined voltage threshold are first determined. The first predetermined voltage threshold is greater than the second predetermined voltage threshold. For example, the first predetermined voltage threshold may be 260 V, and the second predetermined voltage threshold may be 200 V. In response to determining the voltage difference, the first predetermined voltage threshold, and the second predetermined voltage threshold, the voltage difference is compared with the first predetermined voltage threshold. When the voltage difference is greater than or equal to the first predetermined voltage threshold, it indicates that a current power supply voltage of the half bus load 13 is relatively large, and there may be a risk of overvoltage. Therefore, the full bus load 12 is controlled to be turned on to discharge the upper half bus capacitor C1, so as to complete the voltage reduction process on the voltage between the midpoint O of the DC bus and the negative terminal N of the DC bus, thereby preventing the fault caused by the overvoltage operation of the half bus load 13. When the voltage difference is smaller than or equal to the second predetermined voltage threshold, it indicates that the current power supply voltage of the half bus load 13 is relatively small, and there may be a risk of insufficient power supply. Therefore, the full bus load 12 is controlled to be turned off to charge the upper half bus capacitor C1, so as to complete the voltage boosting process on the voltage between the midpoint O of the DC bus and the negative terminal N of the DC bus, thereby ensuring that the half bus load 13 can operate normally.

It should be noted that, in this embodiment, in response to determining the voltage difference, the first predetermined voltage threshold, and the second predetermined voltage threshold, it is not limited that the voltage difference must be compared with the first predetermined voltage threshold or the second predetermined voltage threshold first, but may be compared simultaneously. That is, in response to obtaining the voltage difference, it may be determined whether the voltage difference is greater than or equal to the first predetermined voltage threshold or smaller than or equal to the second predetermined voltage threshold.

In some embodiments, when the second DC power is outputted from the midpoint of the DC bus and the positive terminal of the DC bus, as shown in FIG. 6, the controlling the full bus load to be turned on or off based on the voltage difference includes operations at blocks.

At block S601, a second half bus voltage reference value is determined.

At block S602, the full bus load is controlled to be turned on and the full bus load is adjusted to equalize the voltage difference with the second half bus voltage reference value.

In an exemplary embodiment of the present disclosure, referring to FIG. 2 and FIG. 6, the second DC power is outputted from the positive terminal P of the DC bus and the midpoint O of the DC bus. A second half bus voltage reference value V2_ref is first determined in this embodiment, and the second half bus voltage reference value V2_ref may be a reference value of the upper half bus voltage, i.e., a reference value of the voltage between the positive terminal P of the DC bus and the midpoint O of the DC bus. In response to determining the voltage difference and the second half bus voltage reference value V2_ref, the two are compared. The full bus load is adjusted based on a comparison result. Information such as power, current, and voltage of the full bus load may be adjusted. It should be understood that by adjusting the full bus load, a discharge state of the lower half bus capacitor can be controlled, and then the voltage difference can be adjusted to allow the voltage difference to be equal to the second half bus voltage reference value V2_ref. In this way, the half bus load is ensured to operate in a better state.

It should be noted that, in some embodiments, in response to determining the voltage difference and the second half bus voltage reference value V2_ref, the two are compared. When the voltage difference is greater than the second half bus voltage reference value V2_ref, it indicates that a power supply voltage of the half bus load 13 is relatively large in this case, and there may be a risk of overvoltage. Therefore, the full bus load 12 is controlled to be turned on to discharge the lower half bus capacitor C2, so as to complete a voltage reduction process on the voltage between the positive terminal P of the DC bus and the midpoint O of the DC bus. In this way, the voltage difference is equal to or close to the second half bus voltage reference value V2_ref, thereby preventing a fault caused by an overvoltage operation of the half bus load 13. When the voltage difference is smaller than the second half bus voltage reference value V2_ref, it indicates that the power supply voltage of the half bus load 13 is relatively small in this case, and there may be a risk of insufficient power supply. Therefore, the full bus load 12 is controlled to be turned off to charge the lower half bus capacitor C2, so as to complete a voltage boosting process on the voltage between the positive terminal P of the DC bus and the midpoint O of the DC bus. In this way, the voltage difference is equal to or close to the second half bus voltage reference value V2_ref, thereby ensuring that the half bus load 13 can operate normally.

In some embodiments, when the second DC power is outputted from the midpoint of the DC bus and the positive terminal of the DC bus, the controlling the full bus load to be turned on or off based on the voltage difference includes: controlling, when the voltage difference is greater than or equal to a third predetermined voltage threshold, the full bus load 12 to be turned on to discharge the lower half bus capacitor C2; and controlling, when the voltage difference is smaller than or equal to a fourth predetermined voltage threshold, the full bus load 12 to be turned off to charge the lower half bus capacitor C2. The third predetermined voltage threshold is greater than the fourth predetermined voltage threshold.

In an exemplary embodiment of the present disclosure, referring to FIG. 2, the second DC power is outputted from the positive terminal P of the DC bus and the midpoint O of the DC bus. In order to control the voltage difference between the first DC power and the second DC power to be within the predetermined voltage interval, the third predetermined voltage threshold and the fourth predetermined voltage threshold are first determined. The third predetermined voltage threshold is greater than the fourth predetermined voltage threshold. For example, the third predetermined voltage threshold may be 260 V, and the fourth predetermined voltage threshold may be 200 V. In response to determining the voltage difference, the third predetermined voltage threshold, and the fourth predetermined voltage threshold, the voltage difference is compared with the third predetermined voltage threshold. When the voltage difference is greater than or equal to the third predetermined voltage threshold, it indicates that a current power supply voltage of the half bus load 13 is relatively large, and there may be a risk of overvoltage. Therefore, the full bus load 12 is controlled to be turned on to discharge the lower half bus capacitor C2, so as to complete the voltage reduction process on the voltage between the positive terminal P of the DC bus and the midpoint O of the DC bus, thereby preventing the fault caused by the overvoltage operation of the half bus load 13. When the voltage difference is smaller than or equal to the fourth predetermined voltage threshold, it indicates that the current power supply voltage of the half bus load 13 is relatively small, and there may be a risk of insufficient power supply. Therefore, the full bus load 12 is controlled to be turned off to charge the lower half bus capacitor C2, so as to complete the voltage boosting process on the voltage between the positive terminal P of the DC bus and the midpoint O of the DC bus, thereby ensuring that the half bus load 13 can operate normally.

It should be noted that, in this embodiment, in response to determining the voltage difference, the third predetermined voltage threshold, and the fourth predetermined voltage threshold, it is not limited that the voltage difference must be compared with the third predetermined voltage threshold or the fourth predetermined voltage threshold first, but may be compared simultaneously. That is, in response to obtaining the voltage difference, it may be determined whether the voltage difference is greater than or equal to the third predetermined voltage threshold or smaller than or equal to the fourth predetermined voltage threshold.

Figure 7:
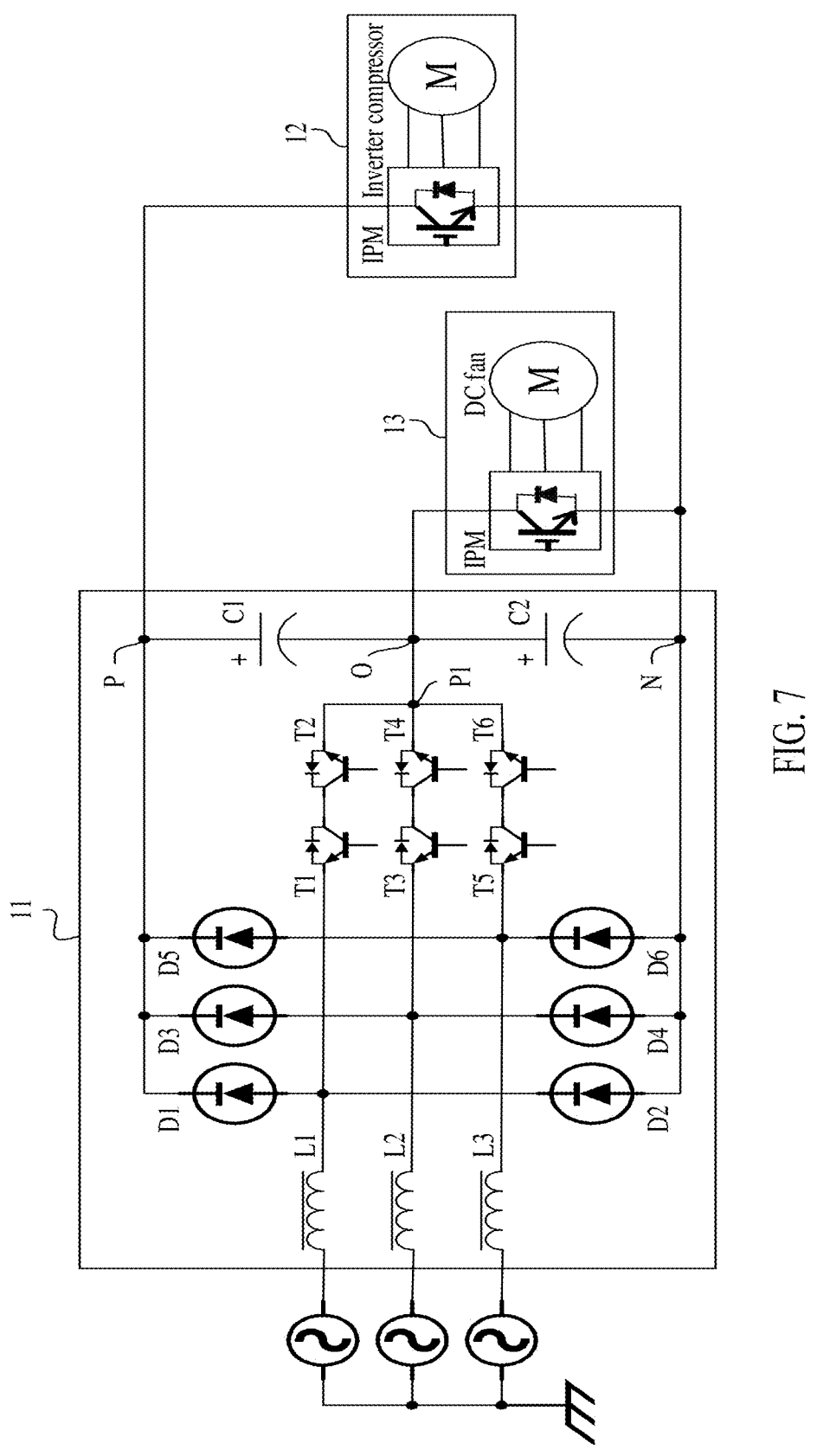
FIG. 7 is a circuit schematic view of a household electrical appliance according to another embodiment of the present disclosure.

In some embodiments, as shown in FIG. 7, the full bus load 12 is a compressor and the half bus load 13 is a DC fan.

In an exemplary embodiment of the present disclosure, as shown in FIG. 7, the full bus load 12 in this embodiment may be the compressor, and the compressor is controlled to be turned on or off by an Intelligent Power Module (IPM). The half bus load 13 may be the DC fan, and the DC fan is further controlled to be turned on or off by the IPM. When the DC fan is in operation and the compressor is not in operation, a power supply voltage of the DC fan can be adjusted by controlling the compressor to be turned on and off to prevent the DC fan from overvoltage operation.

Figure 8:
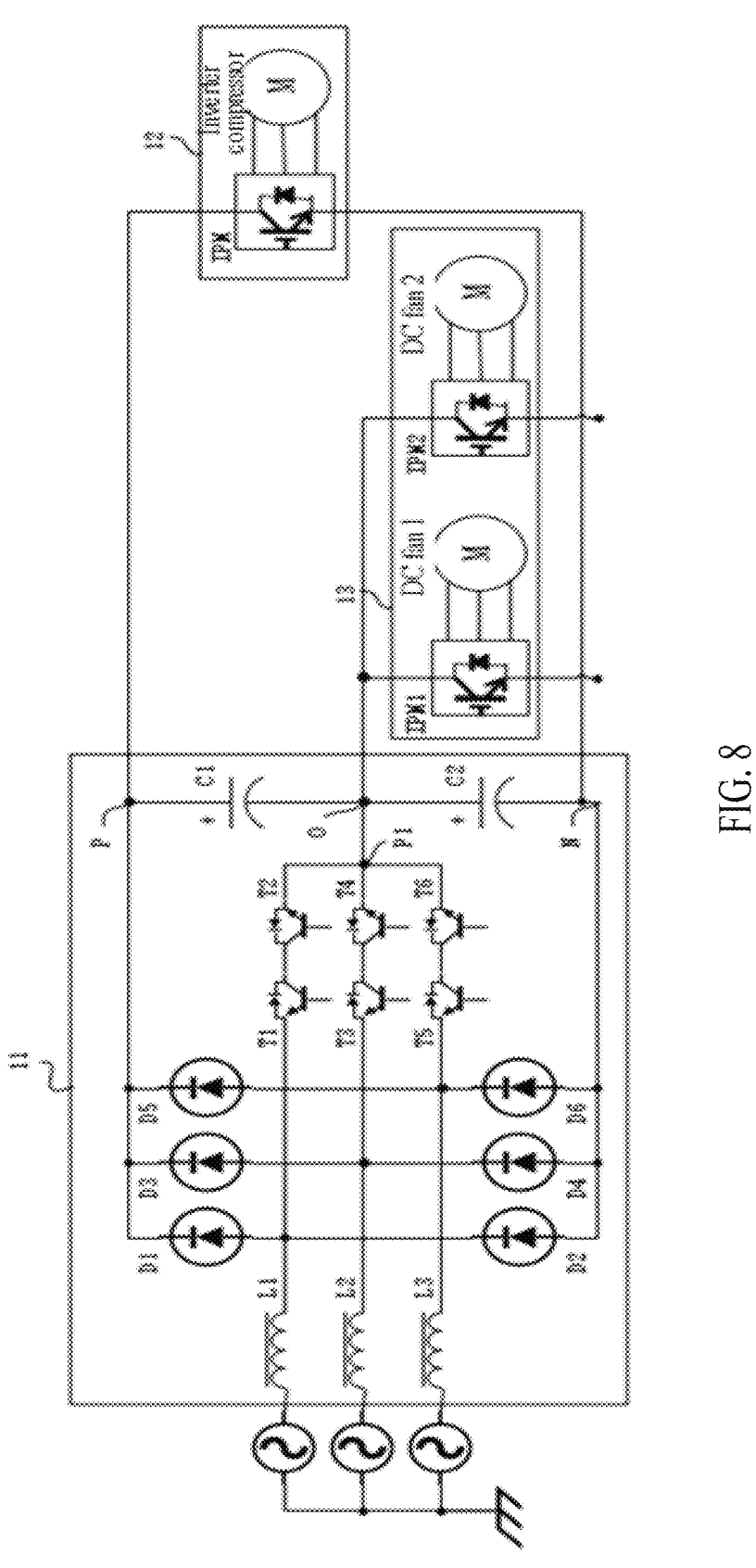
FIG. 8 is a circuit schematic view of a household electrical appliance according to another embodiment of the present disclosure.

In other embodiments, as shown in FIG. 8, the half bus load 13 in this embodiment may include a plurality of DC fans, and each of the plurality of DC fans is correspondingly provided with the IPM for controlling the DC fan to be turned on and off. In other embodiments, the full bus load 12 may further include a plurality of compressors (not shown in the figures). A method for controlling a circuit shown in FIG. 8 is also controlled based on the control method described in the above embodiments, which will not be described again.

To sum up, in the method for controlling the full bus load to discharge according to this embodiment, firstly, in response to determining that the half bus load is turned on and the full bus load is turned off, the voltage difference between the first DC power and the second DC power is determined. The first DC power and the second DC power are obtained by converting the three-phase power through the three-level active PFC unit. Subsequent to the voltage difference between the first DC power and the second DC power being determined, the full bus load is controlled to be turned on or off based on the voltage difference to stabilize the half bus voltage in the predetermined voltage interval. Therefore, the method in this embodiment can perform the voltage stabilization control on the bus voltage, thereby avoiding the overvoltage or the undervoltage of the bus, and improving the service life and the operation safety of the household electrical appliance.

The present disclosure provides a computer-readable storage medium storing a program for controlling a full bus load to discharge in a household electrical appliance. The program for controlling the full bus load to discharge in the household electrical appliance, when executed by a processor, implements the method for controlling the full bus load to discharge in the household electrical appliance according to the above embodiments.

In the computer-readable storage medium according to the embodiments of the present disclosure, the processor executes the program, for controlling the full bus load to discharge in the household electrical appliance, stored in the computer-readable storage medium, which can perform the voltage stabilization control on the bus voltage, thereby avoiding the overvoltage or the undervoltage of the bus, and improving the service life and the operation safety of the household electrical appliance.

Figure 9:
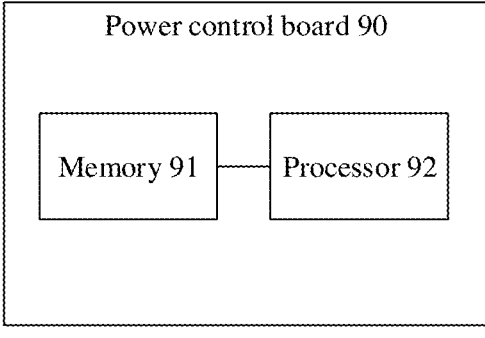
FIG. 9 is a structural block diagram of a power control board for a household electrical appliance according to an embodiment of the present disclosure.

FIG. 9 is a structural block diagram of a power control board for a household electrical appliance according to an embodiment of the present disclosure.

As shown in FIG. 9, the present disclosure provides a power control board 90 for the household electrical appliance. The power control board 90 includes: a memory 91; at least one processor 92; and a program, for controlling a full bus load to discharge in a household electrical appliance, stored in the memory 91 and executable on the at least one processor 92. The processor 92, when executing the program for controlling the full bus load to discharge in the household electrical appliance, implements the method for controlling the full bus load to discharge in the household electrical appliance according to the above embodiments.

In the power supply control board for the household electrical appliance according to embodiments of the present disclose, the power supply control board includes the memory and the processor. The processor executes the program, for controlling the full bus load to discharge in the household electrical appliance, stored in the memory, which can perform the voltage stabilization control on the bus voltage, thereby avoiding the overvoltage or the undervoltage of the bus, and improving the service life and the operation safety of the household electrical appliance.

Figure 10:
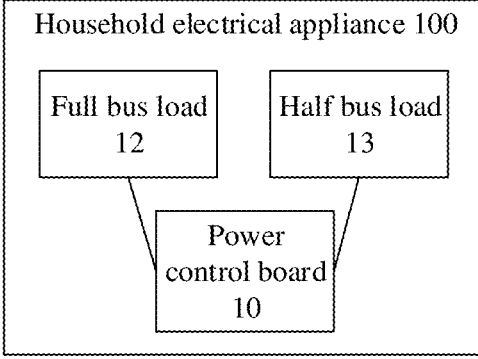
FIG. 10 is a structural block diagram of a household electrical appliance according to an embodiment of the present disclosure.

FIG. 10 is a structural block diagram of the household electrical appliance according to an embodiment of the present disclosure.

As shown in FIG. 10, the present disclosure provides a household electrical appliance 100 including a full bus load 12, a half bus load 13, and a power control board 10.

The power control board 10 includes a three-level active PFC unit and a control unit or controller. The three-level active PFC unit includes an upper half bus capacitor and a lower half bus capacitor connected in series between a positive terminal of the DC bus and a negative terminal of the DC bus. A node between the upper half bus capacitor and the lower half bus capacitor is a midpoint of the DC bus. The three-level active PFC unit is configured to convert an inputted three-phase power to output a first DC power and a second DC power through the positive terminal of the DC bus, the negative terminal of the DC bus, and the midpoint of the DC bus. The first DC power is configured to supply power to the full bus load 12. The second DC power is configured to supply power to the half bus load 13. The control unit is configured to: determine a voltage difference between the first DC power and the second DC power when the full bus load 12 is turned off and the half bus load 13 is turned on; and control the full bus load 12 to be turned on or off based on the voltage difference to stabilize a half bus voltage in a predetermined voltage interval.

In the household electrical appliance according to this embodiment, when the control unit in the power control board determines that the half bus load is turned on and the full bus load is turned off, the voltage difference between the first DC power and the second DC power is determined. The first DC power and the second DC power are obtained by converting the three-phase power through the three-level active PFC unit. Subsequent to the voltage difference between the first DC power and the second DC power being determined, the full bus load is controlled to be turned on or off based on the voltage difference to stabilize the half bus voltage in the predetermined voltage interval. Therefore, the household electrical appliance in this embodiment can perform the voltage stabilization control on the bus voltage, thereby avoiding the overvoltage or the undervoltage of the bus, and improving the service life and the operation safety of the household electrical appliance.

In some embodiments, when the second DC power is outputted from the midpoint of the DC bus and the negative terminal of the DC bus, the voltage difference is the voltage between the positive terminal of the DC bus and the midpoint of the DC bus. When the second DC power is outputted from the midpoint of the DC bus and the positive terminal of the DC bus, the voltage difference is the voltage between the midpoint of the DC bus and the negative terminal of the DC bus.

In some embodiments, when the second DC power is outputted from the midpoint of the DC bus and the negative terminal of the DC bus, the control unit is configured to: determine the first half bus voltage reference value; control, when the voltage difference is greater than the first half bus voltage reference value, the full bus load to be turned on to discharge the upper half bus capacitor; and control, when the voltage difference is smaller than the first half bus voltage reference value, the full bus load to be turned off to charge the upper half bus capacitor.

In some embodiments, when the second DC power is outputted from the midpoint of the DC bus and the negative terminal of the DC bus, the control unit is configured to: control, when the voltage difference is greater than or equal to the first predetermined voltage threshold, the full bus load to be turned on to discharge the upper half bus capacitor; and control, when the voltage difference is smaller than or equal to the second predetermined voltage threshold, the full bus load to be turned off to charge the upper half bus capacitor. The first predetermined voltage threshold is greater than the second predetermined voltage threshold.

In some embodiments, when the second DC power is outputted from the midpoint of the DC bus and the positive terminal of the DC bus, the control unit is configured to:

determine the second half bus voltage reference value; control, when the voltage difference is greater than the second half bus voltage reference value, the full bus load to be turned on to discharge the lower half bus capacitor; and control, when the voltage difference is smaller than the second half bus voltage reference value, the full bus load to be turned off to charge the lower half bus capacitor.

In some embodiments, when the second DC power is outputted from the midpoint of the DC bus and the positive terminal of the DC bus, the control unit is configured to: control, when the voltage difference is greater than or equal to the third predetermined voltage threshold, the full bus load to be turned on to discharge the lower half bus capacitor; and control, when the voltage difference is smaller than or equal to the fourth predetermined voltage threshold, the full bus load to be turned off to charge the lower half bus capacitor. The third predetermined voltage threshold is greater than the fourth predetermined voltage threshold.

In some embodiments, the full bus load is the compressor. The half bus load is the DC fan.

It should be noted that, for a specific implementation mode of the household electrical appliance in the embodiments of the present disclosure, reference may be made to the specific implementation mode of the method for controlling the full bus load to discharge in the household electrical appliance in the above embodiments, and details thereof are omitted herein.

In summary, the household electrical appliance according to the embodiments of the present disclosure can perform the voltage stabilization control on the bus voltage, thereby avoiding the overvoltage or the undervoltage of the bus, and improving the service life and the operation safety of the household electrical appliance.

In addition, other components and functions of the household electrical appliance according to the embodiments of the present disclosure are known to those skilled in the art, and are not described herein in detail to reduce redundancy.

Although embodiments of the present disclosure have been shown and described above, it should be understood that the above embodiments are merely exemplary, and cannot be construed as limitations of the present disclosure. For those skilled in the art, changes, modifications, alternatives and variants can be made to the above embodiments without departing from the scope of the present disclosure.

What is claimed is:

1. A method for controlling a full bus load in a household electrical appliance, wherein:

the household electrical appliance comprises a three-level active Power Factor Correction (PFC) circuit, a full bus load, and a half bus load;

the three-level active PFC circuit comprises an upper half bus capacitor and a lower half bus capacitor connected in series between a positive terminal of a Direct Current (DC) bus and a negative terminal of the DC bus;

a node between the upper half bus capacitor and the lower half bus capacitor is a midpoint of the DC bus;

the full bus load is connected between the positive terminal and the negative terminal, and the half bus load is connected between the midpoint and one of the positive terminal and the negative terminal;

the three-level active PFC circuit is configured to convert an inputted three-phase power to output a first DC power through the positive terminal of the DC bus and the negative terminal of the DC bus, and to output a second DC power through the midpoint of the DC bus and the negative terminal of the DC bus or through the positive terminal of the DC bus and the midpoint of the DC bus, the first DC power being configured to supply power to the full bus load, and the second DC power being configured to supply power to the half bus load; and the method comprises:

determining a voltage difference between the first DC power and the second DC power when the full bus load is turned off and the half bus load is turned on; and controlling the full bus load to be turned on or off based on the voltage difference to stabilize a half bus voltage in a predetermined voltage interval.

2. The method according to claim 1, wherein:

when the second DC power is outputted from the midpoint of the DC bus and the negative terminal of the DC bus, the voltage difference is a voltage between the positive terminal of the DC bus and the midpoint of the DC bus; and when the second DC power is outputted from the midpoint of the DC bus and the positive terminal of the DC bus, the voltage difference is a voltage between the midpoint of the DC bus and the negative terminal of the DC bus.

3. The method according to claim 2, wherein when the second DC power is outputted from the midpoint of the DC bus and the negative terminal of the DC bus, said controlling the full bus load to be turned on or off based on the voltage difference comprises:

determining a first half bus voltage reference value; and controlling the full bus load to be turned on and adjusting the full bus load to equalize the voltage difference with the first half bus voltage reference value.

4. The method according to claim 2, wherein when the second DC power is outputted from the midpoint of the DC bus and the negative terminal of the DC bus, said controlling the full bus load to be turned on or off based on the voltage difference comprises:

controlling, when the voltage difference is greater than or equal to a first predetermined voltage threshold, the full bus load to be turned on to discharge the upper half bus capacitor; and controlling, when the voltage difference is smaller than or equal to a second predetermined voltage threshold, the full bus load to be turned off to charge the upper half bus capacitor, wherein the first predetermined voltage threshold is greater than the second predetermined voltage threshold.

5. The method according to claim 2, wherein when the second DC power is outputted from the midpoint of the DC bus and the positive terminal of the DC bus, said controlling the full bus load to be turned on or off based on the voltage difference comprises:

determining a second half bus voltage reference value; and controlling the full bus load to be turned on and adjusting the full bus load to equalize the voltage difference with the second half bus voltage reference value.

6. The method according to claim 2, wherein when the second DC power is outputted from the midpoint of the DC bus and the positive terminal of the DC bus, said controlling the full bus load to be turned on or off based on the voltage difference comprises:

controlling, when the voltage difference is greater than or equal to a third predetermined voltage threshold, the full bus load to be turned on to discharge the lower half bus capacitor; and controlling, when the voltage difference is smaller than or equal to a fourth predetermined voltage threshold, the full bus load to be turned off to charge the lower half bus capacitor, wherein the third predetermined voltage threshold is greater than the fourth predetermined voltage threshold.

7. The method according to claim 1, wherein:
the full bus load comprises a compressor; and
the half bus load comprises a DC fan.

8. A power control board for a household electrical appliance, comprising:
a memory; and
at least one processor;
wherein a program, for controlling a full bus load to discharge in a household electrical appliance, is stored in the memory and executable by the at least one processor, wherein the at least one processor, when executing the program for controlling the full bus load to discharge in the household electrical appliance, implements the method for controlling the full bus load to discharge in the household electrical appliance according to claim 1.

9. A household electrical appliance comprising:
a full bus load;
a half bus load;
a power control board comprising a three-level active Power Factor Correction (PFC) circuit and a controller, wherein:
the three-level active PFC circuit comprises an upper half bus capacitor and a lower half bus capacitor connected in series between a positive terminal of a direct current (DC) bus and a negative terminal of the DC bus;
a node between the upper half bus capacitor and the lower half bus capacitor is a midpoint of the DC bus;
the full bus load is connected between the positive terminal and the negative terminal, and the half bus load is connected between the midpoint and one of the positive terminal and the negative terminal;
the three-level active PFC circuit is configured to convert an inputted three-phase power to output a first DC power through the positive terminal of the DC bus and the negative terminal of the DC bus, and to output a second DC power through the midpoint of the DC bus and the negative terminal of the DC bus or through the positive terminal of the DC bus and the midpoint of the DC bus, the first DC power being configured to supply power to the full bus load, and the second DC power being configured to supply power to the half bus load; and
the controller is configured to: determine a voltage difference between the first DC power and the second DC power when the full bus load is turned off and the half bus load is turned on; and control the full bus load to be turned on or off based on the voltage difference to stabilize a half bus voltage in a predetermined voltage interval.

10. The household electrical appliance according to claim 9, wherein:
when the second DC power is outputted from the midpoint of the DC bus and the negative terminal of the DC bus, the voltage difference is a voltage between the positive terminal of the DC bus and the midpoint of the DC bus; and when the second DC power is outputted from the midpoint of the DC bus and the positive terminal of the DC bus, the voltage difference is a voltage between the midpoint of the DC bus and the negative terminal of the DC bus.

11. The household electrical appliance according to claim 10, wherein when the second DC power is outputted from the midpoint of the DC bus and the negative terminal of the DC bus, the controller is configured to control the full bus load to be turned on or off based on the voltage difference by:
determining a first half bus voltage reference value; and
controlling the full bus load to be turned on and adjusting the full bus load to equalize the voltage difference with the first half bus voltage reference value.

12. The household electrical appliance according to claim 10, wherein when the second DC power is outputted from the midpoint of the DC bus and the negative terminal of the DC bus, the controller is configured to control the full bus load to be turned on or off based on the voltage difference by:
controlling, when the voltage difference is greater than or equal to a first predetermined voltage threshold, the full bus load to be turned on to discharge the upper half bus capacitor; and
controlling, when the voltage difference is smaller than or equal to a second predetermined voltage threshold, the full bus load to be turned off to charge the upper half bus capacitor,
wherein the first predetermined voltage threshold is greater than the second predetermined voltage threshold.

13. The household electrical appliance according to claim 10, wherein when the second DC power is outputted from the midpoint of the DC bus and the positive terminal of the DC bus, the controller is configured to control the full bus load to be turned on or off based on the voltage difference by:
determining a second half bus voltage reference value; and
controlling the full bus load to be turned on and adjusting the full bus load to equalize the voltage difference with the second half bus voltage reference value.

14. The household electrical appliance according to claim 10, wherein when the second DC power is outputted from the midpoint of the DC bus and the positive terminal of the DC bus, the controller is configured to control the full bus load to be turned on or off based on the voltage difference by:
controlling, when the voltage difference is greater than or equal to a third predetermined voltage threshold, the full bus load to be turned on to discharge the lower half bus capacitor; and
controlling, when the voltage difference is smaller than or equal to a fourth predetermined voltage threshold, the full bus load to be turned off to charge the lower half bus capacitor,
wherein the third predetermined voltage threshold is greater than the fourth predetermined voltage threshold.

15. The household electrical appliance according to claim 9, wherein:
the full bus load comprises a compressor; and
the half bus load comprises a DC fan.

* * * * *